(12) United States Patent
Truckai et al.

(10) Patent No.: US 12,496,147 B2
(45) Date of Patent: Dec. 16, 2025

(54) MEDICAL ROBOTIC SYSTEM

(71) Applicant: Meditrina, Inc., San Jose, CA (US)

(72) Inventors: Csaba Truckai, San Jose, CA (US); John H. Shadduck, San Jose, CA (US); Akos Toth, San Jose, CA (US)

(73) Assignee: Meditrina, Inc., San Jose, CA (US)

( * ) Notice: Subject to any disclaimer, the term of this patent is extended or adjusted under 35 U.S.C. 154(b) by 0 days.

(21) Appl. No.: 17/662,182

(22) Filed: May 5, 2022

(65) Prior Publication Data

US 2023/0355324 A1 Nov. 9, 2023

(51) Int. Cl.
*A61B 1/00* (2006.01)
*A61B 1/018* (2006.01)
*A61B 1/05* (2006.01)
*A61B 1/06* (2006.01)
*A61B 1/303* (2006.01)
*A61B 17/32* (2006.01)
*A61B 34/00* (2016.01)
*A61B 34/30* (2016.01)
*A61B 17/00* (2006.01)

(52) U.S. Cl.
CPC .......... *A61B 34/30* (2016.02); *A61B 1/00103* (2013.01); *A61B 1/00124* (2013.01); *A61B 1/00149* (2013.01); *A61B 1/018* (2013.01); *A61B 1/05* (2013.01); *A61B 1/0684* (2013.01); *A61B 1/303* (2013.01); *A61B 17/32002* (2013.01); *A61B 34/70* (2016.02); *A61B 2017/00199* (2013.01); *A61B 2017/00539* (2013.01); *A61B 2034/301* (2016.02)

(58) Field of Classification Search
CPC ..... A61B 34/30; A61B 34/70; A61B 1/00103; A61B 1/00124; A61B 1/00149; A61B 1/018; A61B 1/05; A61B 1/0684; A61B 1/303; A61B 17/32002; A61B 2034/301; A61B 2017/00199; A61B 2017/00539
See application file for complete search history.

(56) References Cited

U.S. PATENT DOCUMENTS

| | | | | |
|---|---|---|---|---|
| 8,377,045 B2 * | 2/2013 | Schena | ................... | A61B 34/37 606/1 |
| 9,949,749 B2 * | 4/2018 | Noonan | ............. | A61B 1/00085 |
| 10,231,793 B2 * | 3/2019 | Romo | ................... | A61B 1/0676 |
| 10,433,717 B1 | 10/2019 | Truckai et al. | | |
| 11,202,683 B2 * | 12/2021 | Tse | ............. | B25J 5/04 |
| 11,259,695 B2 | 3/2022 | Truckai et al. | | |
| 2009/0163948 A1 * | 6/2009 | Sunaoshi | ............... | A61B 34/70 606/205 |
| 2009/0192524 A1 * | 7/2009 | Itkowitz | ................. | A61B 34/30 606/130 |
| 2009/0326553 A1 * | 12/2009 | Mustufa | ................. | A61B 34/74 606/130 |
| 2013/0331644 A1 * | 12/2013 | Pandya | .................. | A61B 34/30 600/102 |
| 2014/0166023 A1 * | 6/2014 | Kishi | .................... | A61B 90/50 128/849 |

(Continued)

*Primary Examiner* — Michael J Carey
*Assistant Examiner* — William B Chou
(74) *Attorney, Agent, or Firm* — Levine Bagade Han LLP (57) ABSTRACT

Robotic surgical systems configured to control the movement and actuation of a single robotic arm, and the movement and actuation of first and second tools carried in a tool holder at a distal end of the robotic arm.

14 Claims, 11 Drawing Sheets

(56) References Cited

U.S. PATENT DOCUMENTS

| | | | |
|---|---|---|---|
| 2015/0038981 A1* | 2/2015 | Kilroy | A61B 90/10 |
| | | | 606/130 |
| 2015/0119637 A1* | 4/2015 | Alvarez | A61M 25/0012 |
| | | | 600/102 |
| 2015/0297300 A1* | 10/2015 | Gomez | A61B 34/76 |
| | | | 901/41 |
| 2018/0085178 A1* | 3/2018 | Komuro | A61B 34/35 |
| 2018/0326144 A1 | 11/2018 | Truckai | |
| 2019/0183504 A1* | 6/2019 | Shelton, IV | A61B 17/0682 |
| 2019/0282073 A1 | 9/2019 | Truckai | |
| 2019/0320874 A1* | 10/2019 | Yu | H02P 21/18 |
| 2020/0000326 A1 | 1/2020 | Truckai et al. | |
| 2020/0138534 A1* | 5/2020 | Garcia Kilroy | A61G 13/101 |
| 2020/0329953 A1 | 10/2020 | Truckai | |
| 2020/0405425 A1* | 12/2020 | Shelton, IV | A61B 34/20 |
| 2021/0045819 A1* | 2/2021 | Castillo | A61B 34/37 |
| 2021/0401275 A1 | 12/2021 | Toth et al. | |
| 2022/0015620 A1 | 1/2022 | Truckai et al. | |
| 2023/0240769 A1* | 8/2023 | Hendrick | A61B 1/00098 |
| | | | 600/106 |

* cited by examiner

MEDICAL ROBOTIC SYSTEM

BACKGROUND

The present invention is related to a robotic surgical system that is configured to control the movement and actuation of a single robotic arm and the movement and actuation of first and second tools carried in a tool holder at a distal end of the robotic arm.

SUMMARY

The principles of the present disclosure relate to medical robotic systems. For example, some aspects, the techniques described herein relate to medical robot system that include: a robotic arm having a plurality of arm segments being adjustable relative to one other to provide movement of the robotic arm relative to a plurality of axes; a tool holder coupled to a distal end of the robotic arm configured to hold at least a first tool and a second tool, the first tool and the second tool being detachable from the robotic arm, wherein the first tool has a first elongate shaft and the second tool has a second elongate shaft, each extending about respective longitudinal axes; a first robotic drive carried by the tool holder adapted to move the first tool relative to its longitudinal axis; and a second robotic drive carried by the tool holder adapted to move the second tool relative to its longitudinal axis.

Variations of the medical robot system can include a first tool comprising an endoscopic viewing device with an image sensor carried at a distal end of the first shaft of the first tool.

In some aspects, the medical robot systems include a first robotic drive that is adapted to rotate the first tool relative to its longitudinal axis.

In some additional aspects, the techniques described herein relate to a medical robot system wherein the second tool includes a tissue treatment device with a working end adapted to treat tissue.

Variations of the medical robotic system further include a medical robot system where the second robotic drive is adapted to axially move the second tool relative to its longitudinal axis. In addition, the second robotic drive can be adapted to rotate the second tool relative to its longitudinal axis.

The medical robot systems can include tools comprising at least one of a resection device, ablation device, coagulation device, biopsy device and dissection device. In some variations, the first tool has a working channel extending through the first elongate shaft and the second elongate shaft of the second tool is adapted for introduction through the working channel.

The robotic arms of various systems can carry a first electrical connector for coupling to a second electrical connector carried by endoscope to electrically couple the image sensor to an image processor. Alternatively, or in combination, the robotic arm can carry an electrical connector for coupling to the endoscopic viewing device for carrying current to at least one LED carried by the endoscopic viewing device.

Additional variations of the systems can include a resection device as the second tool with a motor that drives a cutting member, further including cooperating electrical contacts carried by the robotic arm and the resection device to carry electrical current to the motor in the resection device.

The systems described herein can include any number of user input interfaces for controlling (i) movement of the plurality of arm segments and (ii) actuation of the first robotic drive and the second robotic drive. Such user input interfaces can include at least one of a joystick and a touch screen for controlling the system.

The medical robotic systems can further include a fluid management system operated by the user input interface including a fluid inflow line and a fluid outflow line adapted for coupling with the first tool and the second tool In another variation, medical robot system can include: a robotic arm having a plurality of arm segments being adjustable relative to one other to provide movement of the robotic arm relative to a plurality of axes; a tool holder coupled to a distal end of the robotic arm; a single-use endoscope with an elongate shaft extending to a distal end carrying an image sensor, the single-use endoscope adapted for detachable coupling to the tool holder; and a treatment tool with a tool shaft adapted for detachable coupling to the tool holder; wherein the single-use endoscope has a working channel extending through the elongate shaft, wherein a distal region of the working channel has a first non-expanded shape that is expanded to a second expanded shape by introduction of the tool shaft through the working channel.

An additional variation of a medical robot system can include: a robotic arm having a proximal arm segment, at least one intermediate arm segment and a distal arm segment, where each arm segment is rotatable about an axis at an interface with an adjacent arm segment; and wherein the distal arm segment carries a first motor adapted to move a first tool and a second motor adapted to move a second tool.

In another variation, a medical robot system can include: a robotic arm having a proximal arm segment, at least one intermediate arm segment and a distal arm segment, where each arm segment is rotatable about an axis at an interface with an adjacent arm segment; wherein the distal arm segment has a tool receiver for receiving a tool with an elongated shaft; and wherein the tool receiver carries at least one force sensor for sensing forces on the elongated shaft.

BRIEF DESCRIPTION OF DRAWINGS

Additional aspects of the invention will become clear from the following description of illustrative embodiments and from the attached drawings, in which.

DETAILED DESCRIPTION

Figure 1:
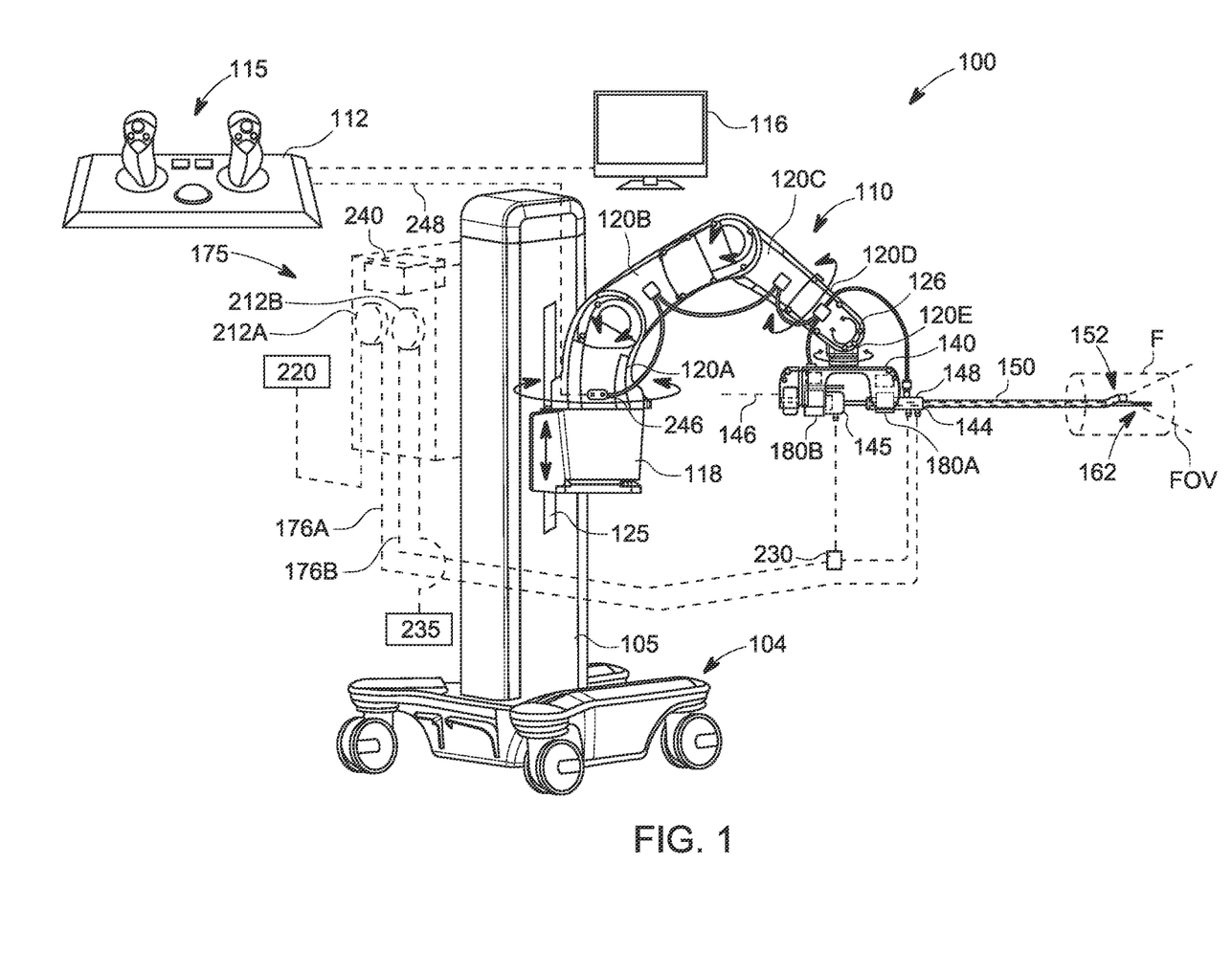
FIG. 1 is an illustration of a surgical robotic system, including a roll stand with a tower portion, a surgical console, and user input interface, and a surgical robotic arm carried with a distal tool holder adapted to carry and actuate first and second tools.
Figure 2:
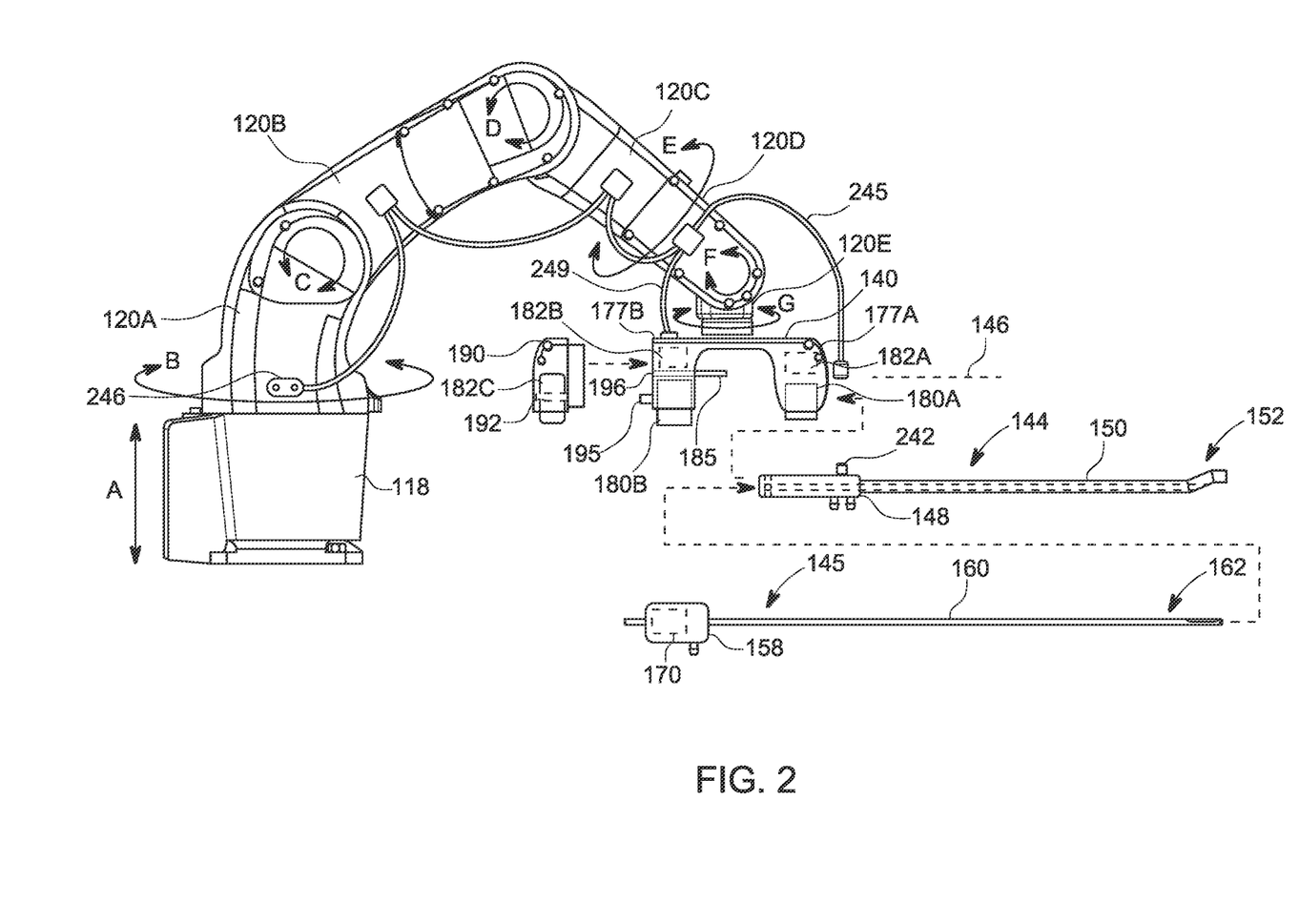
FIG. 2 is an enlarged view of the robot arm of FIG. 1 with first and second single-use tools detached from a tool holder of the robotic arm.

FIG. 1 illustrates a surgical robotic system 100 adapted for use in gynecology procedures or other procedures with similar access requirements that includes a roll stand 104 with a vertical column or tower 105 that carries a surgical robot assembly comprising a robotic arm 110 that is operated from a console 112 with user input interface 115 and image display 116. The user input interface 115 can comprise one or more joysticks, rollerballs, and other input mechanisms known in the art. The image display 116 may be a touch screen that can further be used to direct movement of the arm 110 or control other operating parameters of the system 100. The robotic arm is capable of movement relative to multiple axes as provided by multiple drives and actuators. In FIGS. 1 and 2, it can be seen that the robotic arm 110 has a base platform 118 and six moveable arm segments 120A-120E which are motor driven to move rotationally or axially in directions indicated by arrows A-F as indicated in FIG. 2.

Figure 3:
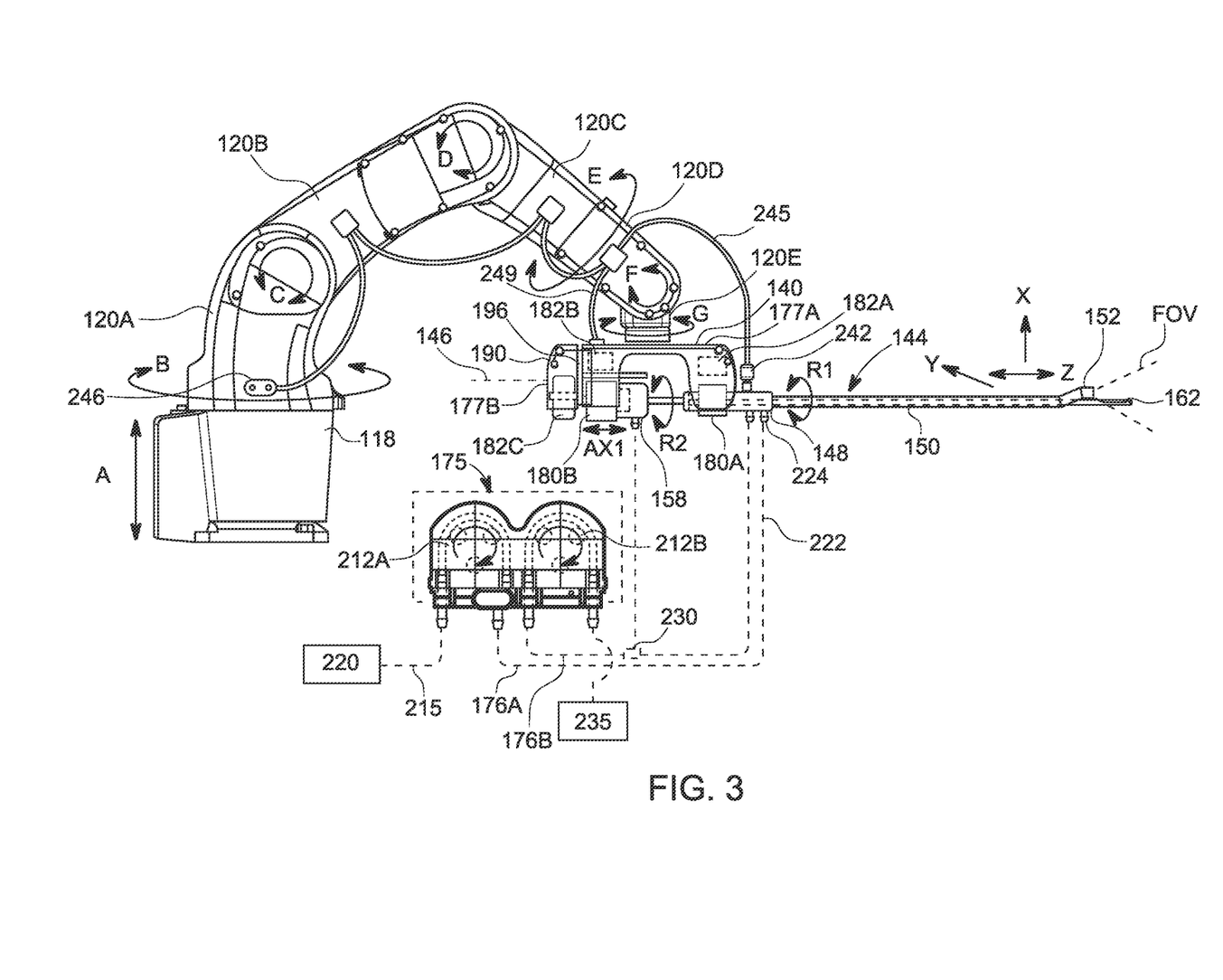
FIG. 3 is a view similar to FIG. 2, with the first and second single-use tools locked into the tool holder of the robotic arm.

Referring to FIG. 1, a lower base platform 118 of robotic arm 110 is motor driven to move vertically on a vertical rail 125 within the tower 105 of the roll stand 104. The robotic arm 110 has a base rotational arm segment 120A rotatably coupled to the base platform 118. The second arm segment 120B, the third arm segment 120C, and the fourth arm segment 120D are adapted to rotate as indicated by arrows B, C, D, and E in FIGS. 2 and 3. The distal end 126 of the fourth arm segment 120D is coupled to rotating segment 120E that is motor driven and is coupled to a tool holder 140. Referring to FIG. 3, in a surgical procedure, it can be understood that the robotic arm 110 can move the distal end of a tool in directions X, Y, and Z.

Figure 4A:
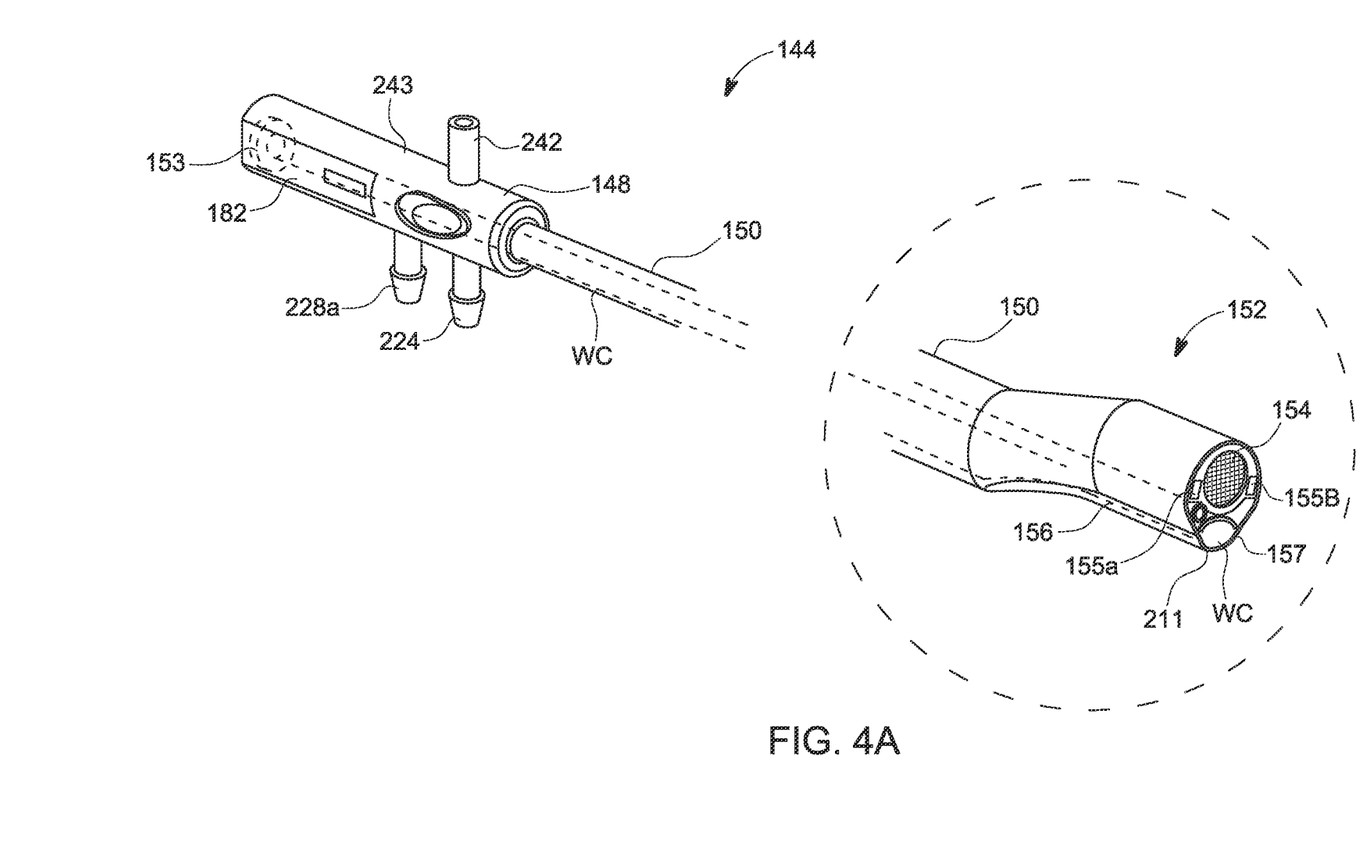
FIG. 4A is a perspective view of the handle and working end of the first single-use tool of FIGS. 1 and 2, which comprises an endoscope with an expandable and collapsible working channel.
Figure 4B:
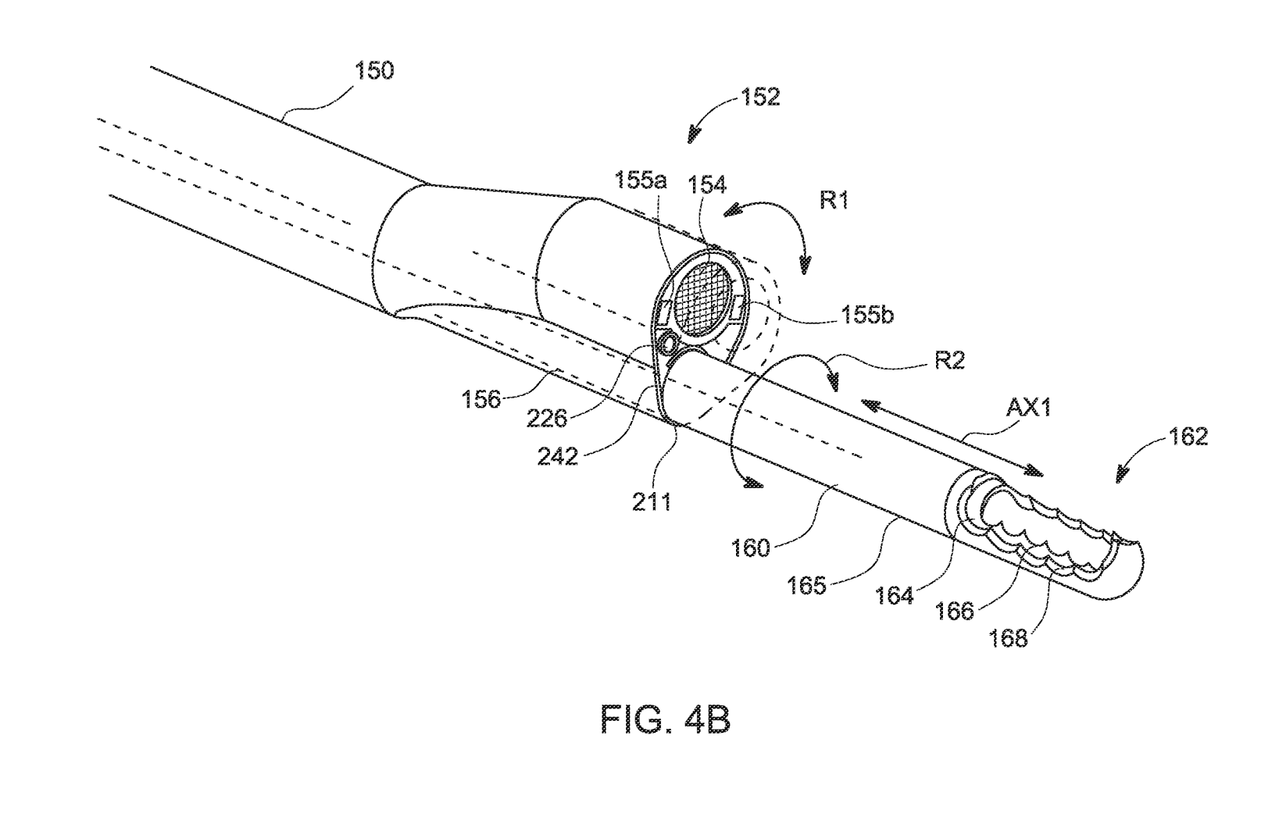
FIG. 4B is a perspective view of the working end of the first tool of FIG. 4B with a resecting device inserted through the expandable-collapsible working channel of the endoscope.

Referring to FIGS. 1, 2, and 3, the tool holder 140 adapted to receive and hold first and second single-use tools 144 and 145 that are further described below. The tool holder 140 holds the first and second tools generally in alignment with, or parallel to, a longitudinal axis 146 of the tool holder. In a system variation shown in FIG. 2, the first and second tools 144, 145 are shown detached from the tool holder 140. The first tool, 144, comprises an endoscope having a proximal handle 148 coupled to an elongate shaft 150 that extends to a working end 152 that carries an image sensor 154 and at least one LED with two LEDs 155a and 155b in this variation (see FIG. 4A). The first tool or endoscope 144 has a working channel WC with a proximal seal 153 and extends from the handle 148 through the working end 152 of the endoscope. The working channel WC has a distal region 156 that is expandable in cross-section to receive the shaft of the second tool 145, which can be a resecting device, as shown in FIGS. 4A-4B. Another variation of an endoscope with an expandable working channel WC is shown in 6A-6B. The variations of endoscopes shown in FIGS. 4A-4B and FIGS. 6A-6B are other related endoscopes with expandable channels and systems are described in more detail in commonly-owned U.S. Pat. Nos. 10,433,717 and 11,259,695 and commonly-owned U.S. patent application Ser. Nos. 15/975,626; 16/351,909; 16/562,069; 16/848,050; 17/447,380 and 17/490,643 which are incorporated herein by this reference.

Figure 5:
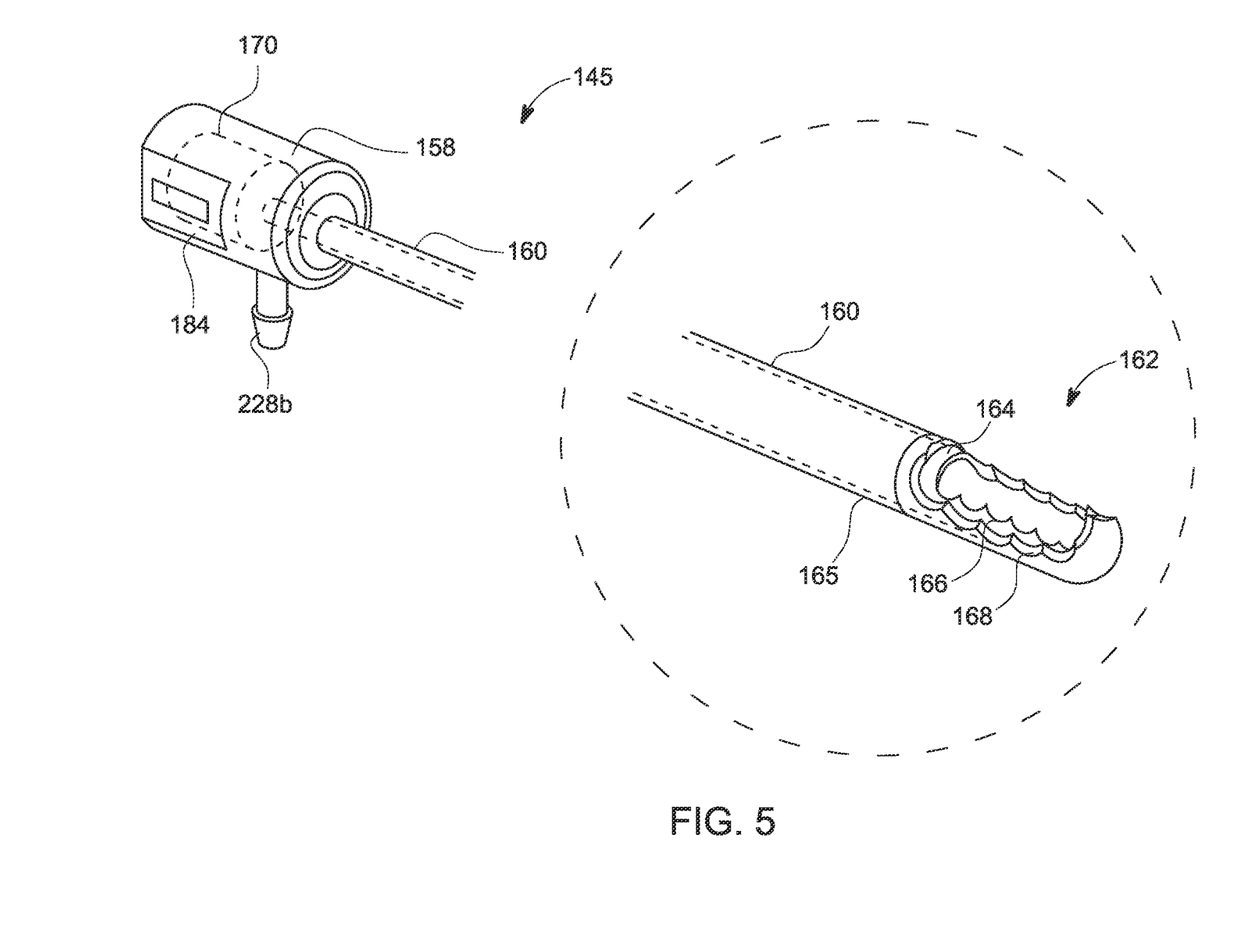
FIG. 5 is a perspective view of the handle and working end of the second single-use tool of FIGS. 1 and 2, which comprises a tubular cutter or resection device.

The second tool 145 can be any tissue treatment device and is shown in FIGS. 1-4A, 5, and 6B as a motor-driven tubular cutter or resection device which is adapted for introduction through the working channel WC of the endoscope 144. The second tool 145 can alternatively consist of any type of cutter, ablation or coagulation device, RF device, biopsy device, ultrasound device, laser device, dissector, retractor, or manipulator, and such a second tool is shown as a resecting device for purposes of illustration. The second tool or resection device 145 has a proximal handle 158 and an elongated shaft assembly 160 with a working end 162 adapted for tissue resection. In FIG. 5, it can be seen that the shaft assembly 160 comprises concentric inner and outer sleeves 164 and 165, respectively, where the inner sleeve 164 has an inner cutting window 166 that rotates in an outer cutting window 168 of the outer sleeve 165 to resect tissue (see FIGS. 4B and 5). The handle 158 of the resection device 145 carries a motor drive 170 for rotating the inner sleeve 164 and inner cutting window 166 at a suitable rotational speed ranging from 1,000 RPM to 10,000 RPM or more for cutting tissue.

As can be seen in FIG. 3, the endoscope 144 and resection device 145 are configured for use with a fluid management system 175, as will be described further below. Typically, the fluid management system 175 includes fluid inflow tubing 176A for delivering distention fluid through the endoscope 144 to a working space in the field F and outflow tubing 176B that is connected to either or both endoscope 144 and the resecting device 145 as will be described below.

Referring now to FIGS. 2 and 3, it can be seen how the first and second tools 144, 145 are assembled to be carried by the tool holder 140. In FIG. 2, it can be seen that the distal end portion 177A of the tool holder 140 carries a first rotating receiver 180A adapted to receive the handle 148 of the endoscope 144. FIG. 4A is an enlarged view of endoscope 144, showing that the handle 148 has a keyed surface 182 that cooperates with keyed surface (not shown) of the rotating receiver 180A for rotational locking of the two components. The rotating receiver 180A of the tool holder 140 is operatively coupled to a first motor drive 182A carried in the tool holder 140 that is adapted to rotate the rotating receiver 180A and the endoscope 144 when locked in place in the direction of arrow R1 in FIGS. 1, 3, and 4B. The motor drive 182A can be a DC stepper motor or other motor type and is adapted to rotate the rotating receiver 180A and locked-in place endoscope 144 from 180° to 360°.

FIGS. 1, 2, and 3 further show that a proximal end portion 177B of the tool holder 140 carries a second rotating receiver 180B adapted to receive the handle 158 of the resection device 145. FIG. 5 is an enlarged view of second tool or resecting device 145, showing the handle 158 has a keyed surface 184 that cooperates with a keyed surface (not shown) of the second rotating receiver 180B to provide for a locked-in rotational engagement of the handle 158. As can be understood, the shaft 160 of the resecting device 145 is inserted through the seal 153 into the working channel WC of the endoscope 144. In a variation, the second rotating receiver 180B is carried on a rail 185 and operatively coupled to a second motor drive 182B in the tool holder 140 that is adapted to axially move the second rotating receiver 180B back and forth along the rail 185 in the direction of arrow AX1 when the resecting tool 145 is locked in place. The second motor drive 182B again can be a DC stepper motor or other suitable motor types. As can be easily understood, the second motor drive 182B is adapted to move the working end 162 of shaft 160 of the resecting device 145 axially between a fully retracted position in the working channel WC of the endoscope 144 and a range of extended positions of the working end 162 as shown in FIG. 3 within the field of view FOV of the endoscope image sensor 154 during a procedure. The range of extension of the shaft 160 and working end 162 is up to 60 mm beyond the plane of lens of the image sensor 154.

Referring again to FIGS. 1 and 2, it can be seen that the tool holder 140 includes a third motor drive 182C that is adapted to move the second rotating receiver 180B rotationally relative to axis 146 of the tool holder 140. In FIG. 2, a detachable drive component 190 is shown carrying the third drive 182C, which allows for simplifying assembling of the endoscope 144 and resecting tool 145 with the tool holder 140. As can be understood from FIGS. 1, 2, and 3, the drive component 190 can be coupled to the tool holder 140 after the endoscope 144 is locked in place in the first rotating receiver 180A, and the resecting device 145 is locked in place in the second rotating receiver 180B. In this variation, the drive component 190 has a motor shaft receiver 192 that receives a keyed actuator member 195 in the rotating receiver 180B for rotation thereof. The drive component 182C is adapted to rotate the second receiver 180B and locked-in resection device 145 from 45° to 360°. Also, the interface 196 between the drive component 190 and the tool holder 140 or receiver 180B has electrical contacts for coupling current to the drive component 190 (not shown). It can be easily understood that a wide variety of features and mechanisms can be envisioned for detachable coupling of the endoscope 144 and resecting device 145 to the tool holder and further allowing for (i) rotational movement of the endoscope 144 and (ii) rotational and axial movement of the resecting device 145 within the working channel WC of the endoscope 144, all of which fall within the scope of the invention.

In general, a robotic system of the invention comprises a surgical robotic arm with a base and a plurality of arm segments that rotate or translate relative to a plurality of axes, wherein at least one distal segment of the robotic arm is adapted for detachable coupling to first and second tools, and wherein drive mechanisms in the at least one distal segment are adapted to move the first tool rotationally (arrow R1 in FIG. 3) and to move the second tool axially and rotationally (arrows AX1 and R2 in FIG. 3) relative to an axis 146 of a distal segment of the robotic arm, which in a variation, is the tool holder 140.

Thus, it can be understood that the motor drives of the robotic arm 110 and tool holder 140 are adapted to receive user commands from the user input interface 115 to advance the endoscope 144 generally axially about, or parallel to, axis 146 of the tool holder 140 by means of actuation of arm segments 120A-120E of robotic arm 110, and thereafter the working end 162 of the resecting tool 145 can be advanced distally and outwardly, and rotationally, from the working channel WC of the endoscope 144 by drives 182B and 182C of the tool holder 140. Thereafter, the endoscope 144 can be rotated by drive 182A to provide the best viewing angle of the resecting device working end 162, and at the same time, the resecting device working end 162 can be rotated and/or moved axially to resect the targeted tissue. A method of moving and rotating the endoscope 144 and resecting device 145 is shown in FIGS. 7A-7D below, where a fibroid 198 in a patient's uterus 200 is targeted for resection. The robotic arm 110 is used to advance the endoscope 144 through the patient's vagina 204 and endocervical canal 205 into the uterine cavity 210, as will be described in more detail below.

Now turning to FIGS. 4A and 4B, the first tool or endoscope 144 is shown in an enlarged view to better illustrate the expandable working channel WC, or more particularly, the distal region 156 of the working channel WC, which is expandable from a first reduced cross-sectional dimension and shape introducing through an endocervical canal 205 to a second expanded cross-section to accommodate the introduction of the second tool or resecting device 145 through the distal region 156 of the working channel WC. In the variation of FIG. 4A, the working end 152 of the endoscope 144 has an "S" curve in a first repose position which provides a reduced cross-section for introduction through the endocervical canal 205. In FIG. 4B, the shaft 160 of resecting device 145 is introduced through the working channel WC, which deflects the inferior or lower surface 211 of the working channel WC outwardly. A single-use endoscope with an expandable working channel of the type shown in FIGS. 4A-4B is described in more detail in commonly-owned U.S. Pat. No. 10,433,717.

FIG. 3 illustrates the fluid management system 175 that is operatively connected to the first and second tools 144 and 145 as is known in the art. The fluid management system 175 includes an inflow peristaltic pump 212A and an outflow peristaltic pump 212B. Inflow tubing 176A has a proximal end 215 coupled to a fluid source 220, such as a saline bag with the distal end 222 of the inflow tubing 176A connected to a Luer fitting 224 in an inferior surface of the endoscope handle 148. The inflow pump 212A is adapted to provide a fluid flow through inflow tubing 176A and a flow channel in the endoscope shaft 150 to an outlet 226 in the working end of the endoscope (see FIG. 4A). In a variation, the outflow tubing 176B is coupled to fitting 228a on the endoscope 144 (FIG. 4A) and fitting 228b on the resection device 145 (FIG. 5). A valve or flow diverter 230 may be provided in outflow tubing 212B to select an outflow fluid path from the endoscope 144 or the resection device 145 (FIGS. 1 and 3). The fluid management system 175 thus would allow use of the endoscope 144 alone where inflows and outflows are through the endoscope shaft 150 when no resection device 145 occupies the working channel WC of the endoscope 144. When the resection device 145 is positioned in the working channel WC as shown in FIG. 3, the outflows would flow through the resection device 145 and fitting 228b on its handle 158. The outflow pump 212B thus is adapted to cause fluid flows from a working space WS to a collection reservoir 235. A tissue trap (not shown) may be provided in the outflow tubing 176B. Independent motor drives are provided to operate the first and second peristaltic pumps 212A and 212B and are controlled by an FMS controller 240 (FIG. 1), which is typically configured to maintain a set pressure in a working space such WS as a uterine cavity.

Referring again to FIGS. 2, 3, and 4A, the endoscope 144 has a connector 242 on its superior surface 243 that is adapted to connect to an electrical cable 245 (FIG. 3), which couples the image sensor 154 in the endoscope shaft 150 to one or more image processors which can be located in the robot arm 110, the roll stand 105 or in the console 112. The electrical cable 245 is shown in FIG. 2 as extending to a socket or connector 246 in or near the base segment 120A of the robotic arm 110 and is further connected by a cable 248 (FIG. 1) to the robotic console 112 and user input interface 115. The electrical cable 245 can have a distal segment 249 that couples electrical current to the drive motors 182A-182C in the tool holder 140 and/or to the motor 170 in the resection device 145. Alternatively, electrical connections to the tool holder 140 and the resection device can be carried with an interior of the robotic arm segments.

Figure 7A:
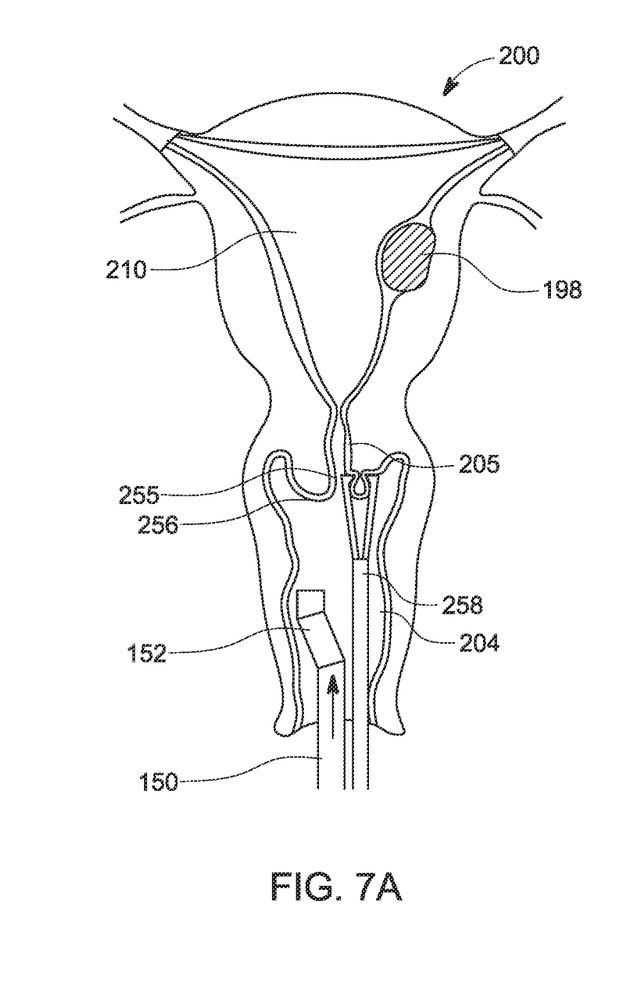
FIG. 7A is a schematic sectional view of a patient's uterus showing a step in a method of using the robotic arm to move the endoscope toward the patient's cervix.

As can be understood from FIGS. 1-4A, the robotic system 100 and tools 144 and 145 are adapted for use in gynecology procedures in which transcervical access is used to treat or diagnose a condition in a patient's uterine cavity 210 (FIG. 7A). For this reason, the robotic arm 110 and the tool holder 140 are adapted to operate the tools within a somewhat narrow field indicated at F in FIGS. 1 and 3. The multiple segments of the arm 110 allow for positioning of the tool holder 140 generally in alignment with the patient's endocervical canal 205 (see FIGS. 3 and 7A), and thereafter the motor drives in the tool holder 140 can move the shafts of the endoscope and resection device within the narrow field F which is the patient's uterine cavity. Of particular interest, the endoscope 144 of the system is configured with a working channel WC that has an expandable distal portion 156 so that the cross-section of the endoscope shaft 150, when introduced through the endocervical canal 205, has a small cross-section. Following introduction of the endoscope shaft 150 through the endocervical canal 205, then a second tool shaft or resecting device 145 can be introduced through the working channel WC to expand the distal portion 156 of the working channel WC within the uterine cavity 210.

In FIG. 4A, it can be seen that the working end 152 of the tool 144 in the endoscope has an "S" curve in its repose or insertion shape. FIG. 4B shows the working end of the endoscope after the shaft 160 from the resection device 145 has been introduced through the expandable distal portion 156 of the working channel WC, where an elastomeric sleeve 157 around the working end 152 is expanded. In FIG. 4B, it can be understood that the working end 162 of resecting device 145 can be moved axially (arrow AX1) and rotationally (arrow R2) by at least one motor drive in the tool holder 140 as described above. Further, the endoscope shaft 150 and image sensor 154 can be rotated (arrow R1) relative to the working end 162 of resection device 145 to allow viewing from any suitable angle.

Figure 6A:
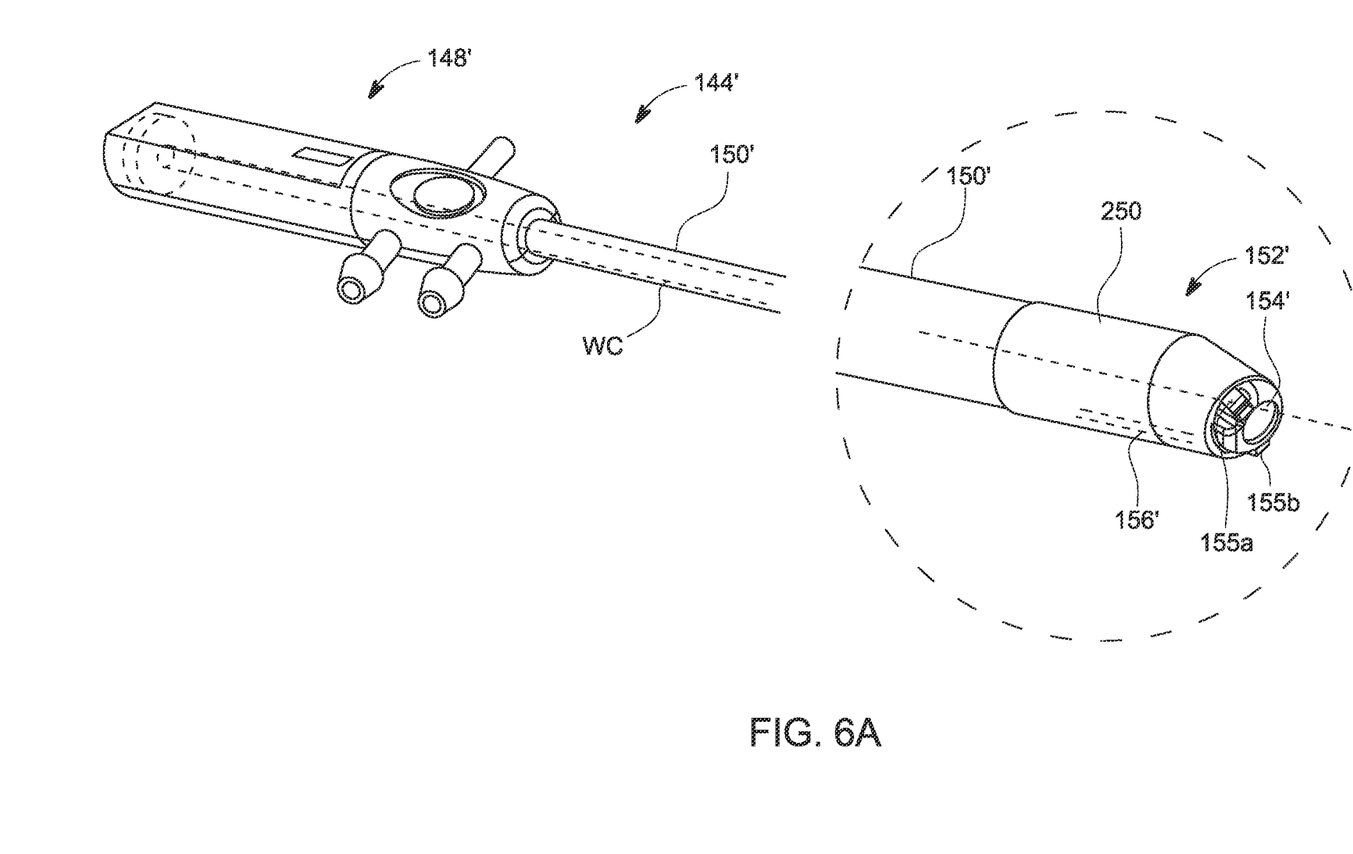
FIG. 6A is a perspective view of another variation of an endoscope showing the handle and working end, which comprises an elastomeric body with an expandable and collapsible working channel therein.
Figure 6B:
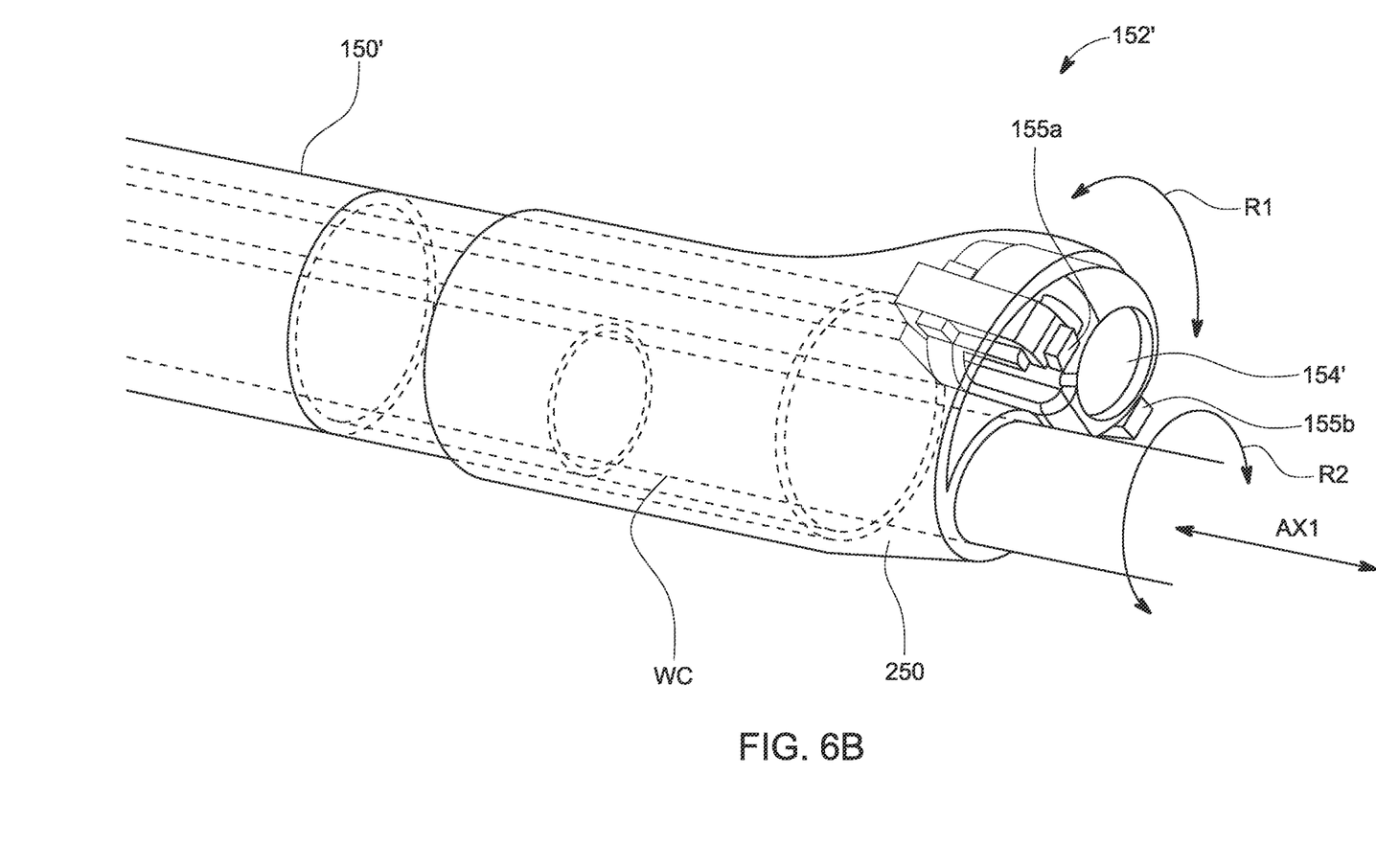
FIG. 6B is a view of the working end of the endoscope of FIG. 6A with the shaft of a resecting device inserted through the expandable-collapsible working channel in the distal portion of the endoscope.

FIGS. 6A-6B illustrate another form of an endoscope 144' that accomplishes the same purposes as the endoscope 144 of FIGS. 4A-4B above. In the variation, a FIG. 6A, it can be seen that the handle 148' is coupled to a shaft 150' having a working end 152' with a small cross-section and comprises an elastomer body 250 that carries the image sensor 154' and two LEDs 155a' and 155b'. In a repose or insertion shape as in FIG. 6A, the working end 152' is configured with a non-expanded or collapsed region 156' of the working channel WC'. After insertion or introduction of the endoscope shaft 150' through the patient's endocervical canal 205, FIG. 6C illustrates the shaft 160' of a resecting device 145' being introduced through the working channel WC, which then expands the working channel 156' in the elastomeric body 250 and deflects the image sensor 154' and LEDs 155a'-155b' outwardly. Thus, the embodiment of FIGS. 6A and 6B again allow for introduction of an endoscope shaft in a reduced cross-sectional shape followed by expansion of the cross-section of the working channel after the endoscope working end is within the patient's uterine cavity 210. All the features and components of the handle 148' function as described above in the variation of FIGS. 4A-4B. A single-use endoscope with an expandable working channel of the type shown in FIGS. 6A-6B is described in more detail in commonly-owned U.S. patent application Ser. No. 16/848,050.

In general, a method of the invention for treating targeted tissue in a patient's uterine cavity comprises providing a robotic arm having a plurality of arm segments that are adjustable relative to one other to provide movement of the robotic arm relative to a plurality of axes, wherein a distal arm segment comprises a tool holder adapted to couple to a single-use endoscope with an elongate shaft having a working channel therein and a treatment tool, and wherein the endoscope shaft has a first insertion profile with a distal region of the working channel in a first non-expanded shape and an expanded working profile with the distal region of the working channel expanded to a second expanded shape by introduction of a shaft of a treatment tool through the working channel, and thereafter (i) operating the robotic arm to introduce the endoscope shaft in its first insertion profile through the patients cervical canal into a uterine cavity, (ii) operating the robotic arm to introduce the shaft of the treatment tool through the working channel thereby expanding the working channel to its second expanded shape and moving the working end to its expanded working profile, and (iii) treating the targeted tissue in the uterine cavity with the working end of the treatment tool.

Now turning to FIGS. 7A to 7D, a method of using the robotic system 100 and the first and second treatment tools (endoscope 144, resecting device 145), is shown in schematic views in a robotic procedure to resect a fibroid 198 in patient's uterine cavity 210. In other variations of methods, the targeted tissue in a patient's uterus can be polyps, adhesions, endometrium and other abnormal tissues as well as fibroids or myomas. In FIG. 7A, it can be understood that the endoscope 144 and resecting device 145 have been locked in the tool holder 140 of the robotic arm (FIGS. 1 and 3), and the user has actuated various segments of robotic arm 110 to align the endoscope shaft 150 and resecting device 145 therein with the external of 255 of patient's cervix 256 after being advanced into the patient's vagina 204, which may be held open with a suitable speculum device (not shown). The movement of the endoscope shaft 150 in all axes is accomplished by the user at the user input interface of FIG. 1. A handheld tenaculum 258 may be used by a nurse or other assisting clinician to stabilize the patient's cervix 256 while the user actuates the robotic arm 110 to align in the endoscope shaft 150 with the patient's endocervical canal 205.

Figure 7B:
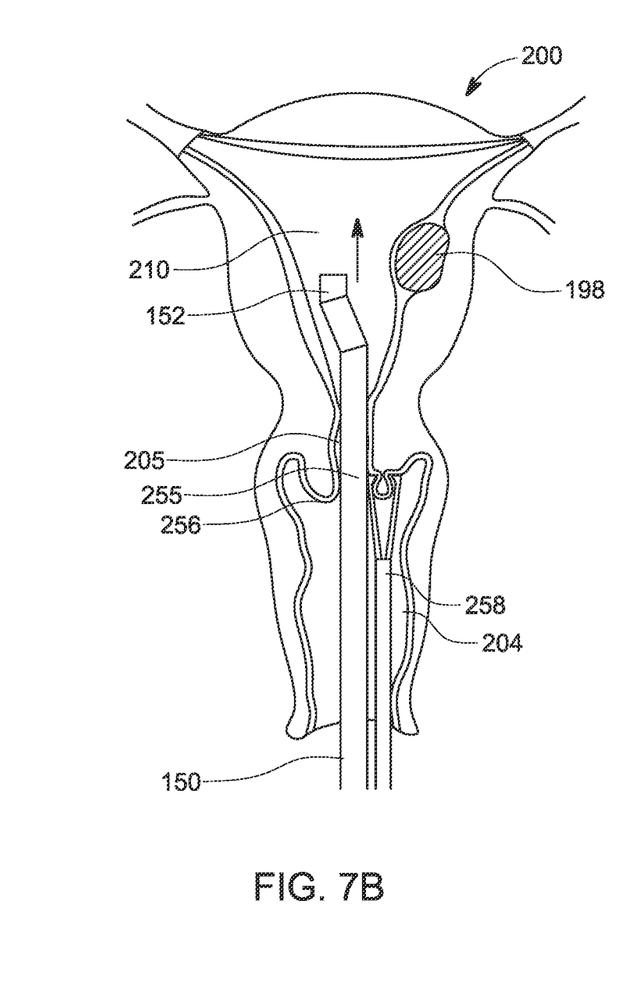
FIG. 7B is a schematic view of a subsequent step of the method illustrating the actuation of the robotic arm to advance the endoscope working end through the endocervical canal into the uterine cavity.
Figure 7C:
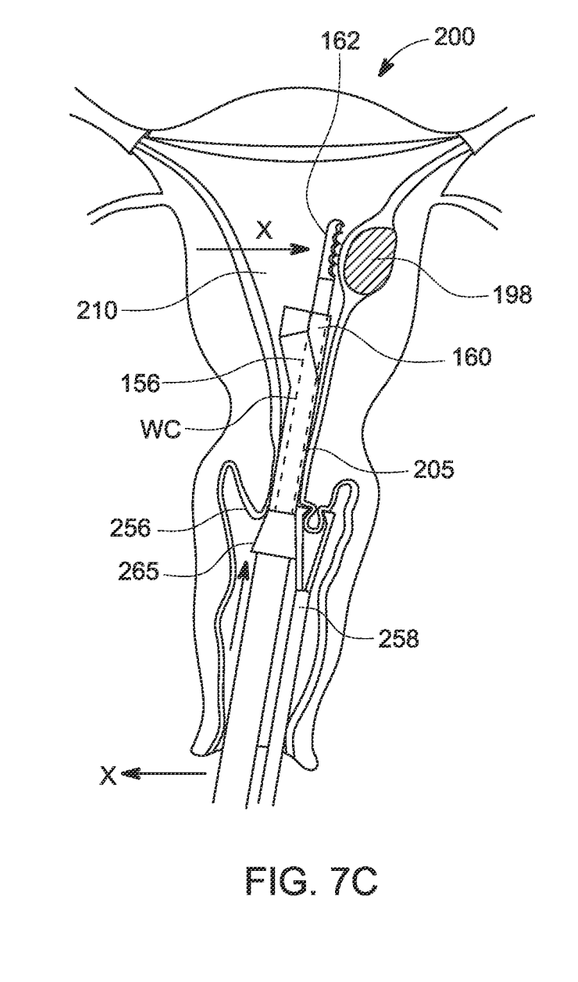
FIG. 7C illustrates another subsequent step of the method where the robotic arm is actuated to advance the resection device through the working channel of the endoscope into the uterine cavity, and further actuating the robotic arm to angle the working end of resection advice towards the fibroid, and also showing a cervical seal mounted on a sleeve being advanced to contact the cervix.

FIG. 7B then shows the user operating the robotic arm 110 to advance the endoscope working end 152 in its reduced cross-section or insertion profile through the endocervical canal 205 into the uterine cavity 210. FIG. 7C further shows the user actuating the motor drive 182B in the tool holder 140 to advance the shaft 160 of the resection device 145 through the working channel WC into the uterine cavity 210, which expands the distal portion 156 of the working channel WC as described above. In FIG. 7C, a cervical seal 265 is also used to press against the cervix 256 to prevent distension fluid from the fluid management system's inflows from leaking outwardly from the endocervical canal 205. Such a cervical seal can be a soft elastomer, a balloon, or other design as is known in the art and can be manually moved into place with a sleeve positioned over the endoscope shaft 150. In other variations, such a cervical seal 265 may be carried on a spring-loaded sleeve to be pushed distally, or in another variation may be moved by an additional motor-driven component (not shown) of the robotic arm 110. FIG. 7C shows the robotic arm 110 moving the distal ends 152 and 162 of the endoscope 144 and 145 respectively in direction or plane X to interface with the surface of the fibroid 198.

Figure 7D:
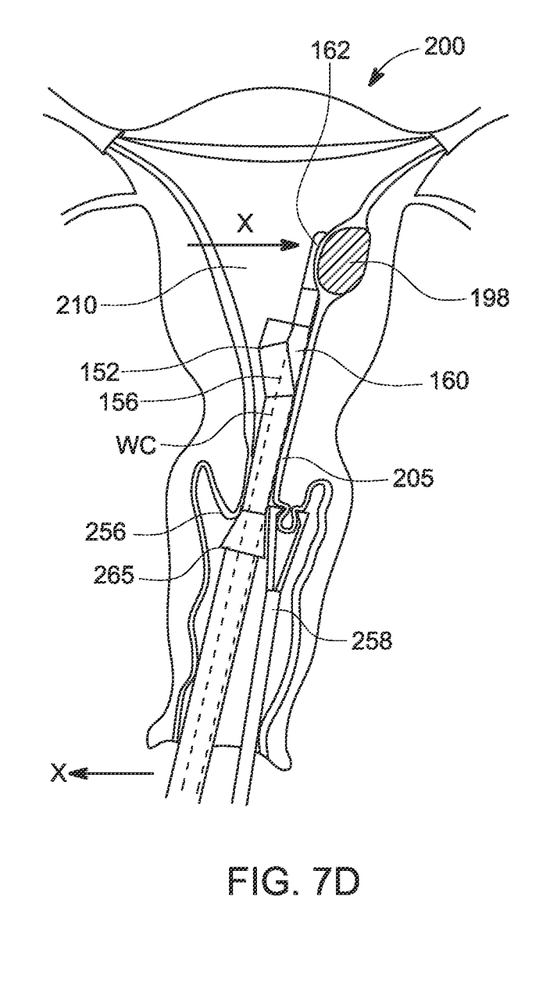
FIG. 7D illustrates another subsequent step of how the method with robotic arm moves the working end of the resection device laterally further to resect tissue of the fibroid.

FIG. 7D illustrates the user using the robotic arm 110 further to tilt the cutting windows 166 and 168 of the resection device 145 into the fibroid 198 to resect and remove tissue. It should be understood that this step of the method of resecting tissue can include moving the working end of the resection device axially and/or rotating the working end slightly back and forth to resect the fibroid 198. Further, the user may rotate the shaft of the endoscope 144 to reposition the image sensor 144 and LED's as shown in FIG. 4B to acquire the best view of the surface of the fibroid 198 that is being resected.

While FIG. 7D illustrates the step of a method of resecting a fibroid, it should be further appreciated that operating parameters of the resecting device 145 and the robotic system 100 can be controlled or automated during the resection by one or more controllers of the robotic system 100. In a variation, for example, the fluid management system 175 can be controlled by the user from the user input interface 115 during resection, which includes adjusting any operating parameter of the fluid management system. Operating parameters of the fluid management system include (i) adjusting the set pressure in the uterine cavity, (ii) increasing fluid inflow temporarily as a flush mechanism to clear resected debris or blood from the viewing field, (iii) increasing fluid pressure to a selected level for a selected time interval as a tamponade, and (iv) adjusting the fluid deficit level and any warnings or system shut-down associated with a fluid deficit. The user can also adjust operating parameters of the endoscope 144 from the user input interface 115, which include (i) adjusting light from the LEDs, and (ii) capturing images or videos of the procedure.

The user can also adjust operating parameters of the resecting device 145 at the user input interface 115, which includes (i) adjusting rotational speed of the inner cutting sleeve 164, and (ii), in some variations, adjusting oscillation and/or translation of the inner cutting sleeve 164 within the outer sleeve 165 during use.

In another variation, the controllers of the robotic system 100 can automate parameters of a resecting interval in a preset "resecting plan" in which actuation of drive motors of the robotic arm 110 is automated to move the working end 162 of the resection device 145 in preset movements while operating to efficiently resect tissue. For example, the user can select the user input interface 115 a resecting plan "RP1" in which the inner cutting sleeve 164 is operated at a selected RPM between 1,000 RPM and 10,000 RPM while contemporaneously the axial drive motor 182B of the tool holder 140 moves the working end 162 of resection device 145 axially back and forth (direction AX1 in FIG. 3) at a selected rate from 0.1 cm/sec to 1.0 cm/sec and for a selected reciprocating distance of 0.1 cm to 2 cm (FIGS. 3 and 7D). The resecting plan RP1 can operate for a preset number of seconds, from 5 seconds to 30 seconds or can be initiated and terminated by a user input. Similarly, a preset resecting plan "RP2" can operate the inner cutting sleeve at an RPM range described above while contemporaneously actuating drive motor 182C to rotate working and 162 of resecting device 145 (direction R2 in FIG. 3) where the rotation is from 10° to 180° degrees at a selected rate ranging between 10°/sec and 90°/sec. Another variation can consist of a preset resecting plan "RP3" which combines both the reciprocation of RP1 and the rotation of RP2 within the parameters described above to resect tissue for any preselected time interval or by initiation and termination by the user. At the same time that the working end 162 of the resecting device is being used in any resecting plan, the user can rotate the working end 152 of endoscope 144 (direction R1 in FIGS. 3 and 4B) to optimize the viewing of the resectioning of tissue. In any of the resecting plans above, the user would be operating the robotic arm to move the device's working ends 152 and 162 in directions X, Y, and Z of FIG. 3 to resect the targeted tissue.

Figure 8:
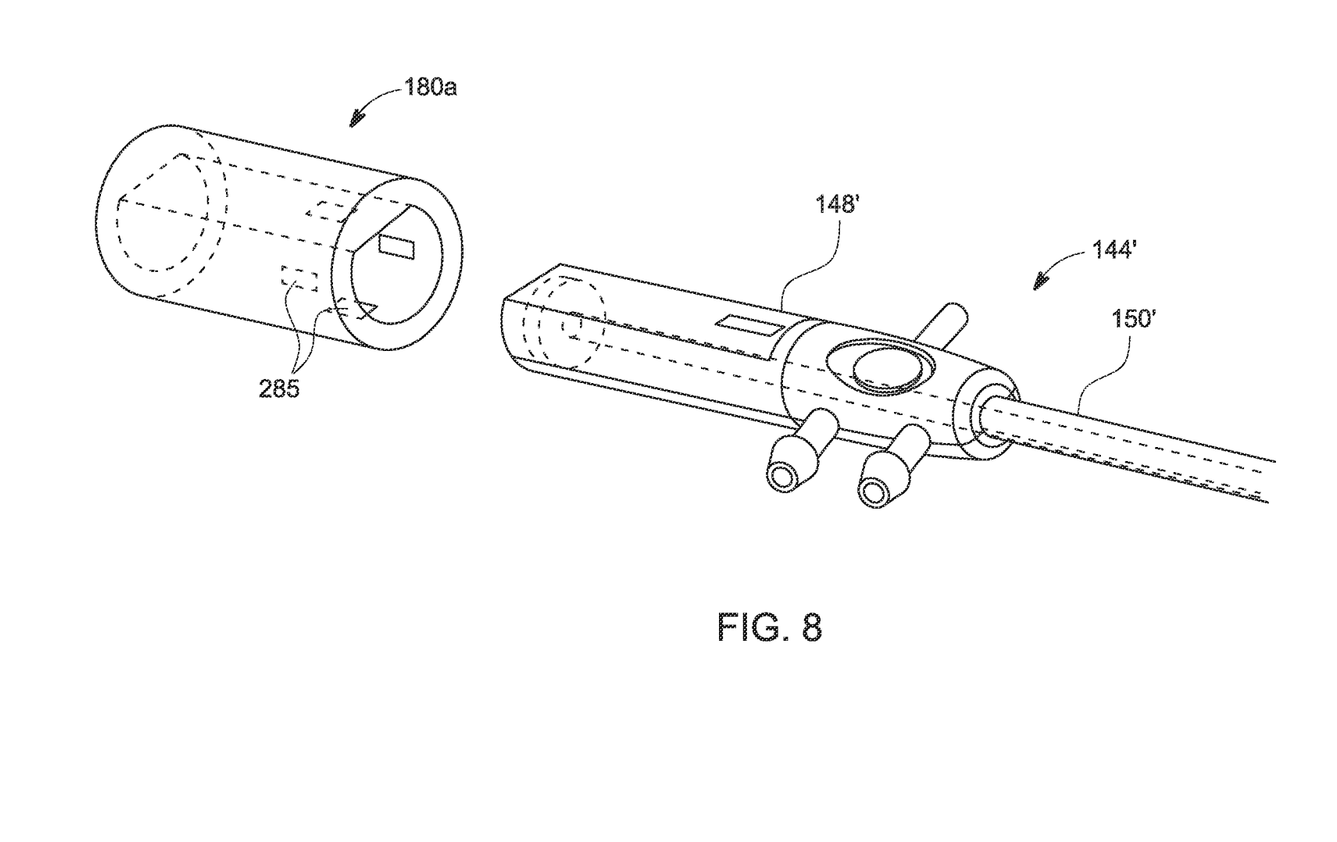
FIG. 8 is a schematic view of a rotating receiver of a tool holder of FIGS. 1 to 3 that receives an endoscope showing force sensors in the interface of the receiver and a handle of the endoscope the sensing forces on endoscope.

In another variation, FIG. 8 shows that the tool holder 140 and, more particularly, the rotating receiver 180A carries a plurality of load sensors or force sensors 285 that are adapted to interface with the handle of an endoscope, for example, handle 148' of endoscope 144' of FIG. 6A, to sense forces being applied to the working ends 152, 162 and shafts 150, 160 of an endoscope 144 and resecting device 145 of FIG. 3 during a resecting procedure. Signals from the force sensors 285 received by a central controller and a control algorithm can continuously monitor the forces and the direction of forces on the shafts 150 and 160 of the devices. In a variation, excess forces, such as bending forces, on the shafts 150 and 160 can provide an audible signal or a visual signal that forces are exceeding a preset level, or the control algorithm can stop operation of the resecting device or automatically initiate a movement of the robotic arm in a suitable direction to reduce forces on the shafts 150 and 160 of the endoscope 144 and the resecting device 145. In another variation, any preset resecting plan above (RP1, RP2, RP3) can include a plan type RP4 that moves the working end 162 of the resecting device 145 in a preselected range of X, Y, and Z movements (see FIG. 3) wherein the force-sensing algorithm further automatically controls and maintains a preselected pressure on the working end 162 as it engages tissue.

Although particular embodiments of the present invention have been described above in detail, it will be understood that this description is merely for purposes of illustration and the above description of the invention is not exhaustive. Specific features of the invention are shown in some drawings and not in others, and this is for convenience only, and any feature may be combined with another in accordance with the invention. A number of variations and alternatives will be apparent to one having ordinary skills in the art. Such alternatives and variations are intended to be included within the scope of the claims. Particular features that are presented in dependent claims can be combined and fall within the scope of the invention. The invention also encompasses embodiments as if dependent claims were alternatively written in a multiple dependent claim format with reference to other independent claims.

It is important to note that where possible, aspects of the various described embodiments, or the embodiments themselves can be combined. Where such combinations are intended to be within the scope of this disclosure.

All references, including publications, patent applications, and patents, cited herein are hereby incorporated by reference to the same extent as if each reference were individually and specifically indicated to be incorporated by reference and were set forth in its entirety herein.

What is claimed is:

1. A medical robot system comprising:
a robotic arm having a plurality of arm segments being adjustable relative to one another to provide movement of the robotic arm relative to a plurality of axes;
a tool holder coupled to a distal end of the robotic arm configured to directly engage a first handle of a first tool and wherein the tool holder is configured to directly engage a second handle of a second tool independently from the first handle, the first handle and the second handle being detachable from the robotic arm to separate the first tool and the second tool from the robotic arm, wherein the first tool has a first elongate shaft and the second tool has a second elongate shaft, each extending about respective longitudinal axes, wherein the first handle is received by a first rotating receiver carried by the tool holder and the second handle is received by a second rotating receiver carried by the tool holder;
a first robotic drive carried by the tool holder adapted to move the first tool rotationally about a longitudinal axis relative to its longitudinal axis; and
a second robotic drive carried by the tool holder adapted to move the second tool rotationally about the relative to its longitudinal axis when the second elongate shaft is positioned coaxially through the first elongate shaft and the second robotic drive is also adapted to move the second tool axially relative the longitudinal axis, while the second elongate shaft is positioned through the first elongate shaft.

2. The medical robot system according to claim 1 wherein the first tool comprises an endoscopic viewing device with an image sensor carried at a distal end of the first elongate shaft of said first tool.

3. The medical robot system according to claim 1 wherein the second tool comprises a tissue treatment device with a working end adapted to treat tissue.

4. The medical robot system according to claim 3 wherein the second tool comprises at least one of a resection device, ablation device, coagulation device, biopsy device and dissection device.

5. The medical robot system according to claim 2 wherein the first tool has a working channel extending through the first elongate shaft and the second elongate shaft of the second tool is adapted for introduction through said working channel.

6. The medical robot system according to claim 5 wherein the first elongate shaft has a first insertion profile with a distal region of the working channel in a first non-expanded shape and an expanded working profile with the distal region of the working channel expanded to a second expanded shape by introduction of a shaft of a treatment tool through the working channel.

7. The medical robot system according to claim 2 wherein the robotic arm carries a first electrical connector for coupling to a second electrical connector carried by the endoscopic endoscope viewing device to electrically couple the image sensor to an image processor.

8. The medical robot system according to claim 2 wherein the robotic arm carries an electrical connector for coupling to the endoscopic viewing device for carrying current to at least one LED carried by the endoscopic viewing device.

9. The medical robot system according to claim 3 wherein the second tool comprises a resection device with a motor that drives a cutting member, further comprising cooperating electrical contacts carried by the robotic arm and the resection device to carry electrical current to a motor in the resection device.

10. The medical robot system according to claim 1 further comprising a user input interface for controlling (i) movement of the plurality of arm segments and (ii) actuation of the first robotic drive and the second robotic drive.

11. The medical robot system according to claim 10 wherein the user input interface includes at least one of a joystick and a touch screen for controlling the medical robot system.

12. The medical robot system according to claim 10 further comprising a fluid management system operated by the user input interface including a fluid inflow line and a fluid outflow line adapted for coupling with the first tool and the second tool.

13. The medical robot system according to claim 1 wherein the tool holder carries at least one force sensor for measuring forces on at least one of the first tool and the second tool during use.

14. A medical robot system comprising:
a robotic arm having a plurality of arm segments being adjustable relative to one another to provide movement of the robotic arm relative to a plurality of axes;
a tool holder coupled to a distal end of the robotic arm, wherein the tool holder comprises a first rotating receiver and a second rotating receiver each configured to receive a handle;
a single-use endoscope with an elongate shaft extending to a distal end carrying an image sensor, the single-use endoscope adapted for direct and detachable coupling to the tool holder; and
a treatment tool with a tool shaft adapted for direct and detachable coupling to the tool holder independently from the single-use endoscope and positioning through the single-use single use endoscope;
wherein the tool holder comprises a first drive coupled to the first rotating receiver and a second drive coupled to the second rotating receiver, the first drive is configured to rotate the single-use endoscope about a longitudinal axis, and the second drive is configured to rotate the treatment tool about the longitudinal axis independently when the treatment tool is positioned through the single-use endoscope and where the second drive is also configured to move the treatment tool axially along the longitudinal axis;
wherein the single-use endoscope has a working channel extending through the elongate shaft, wherein a distal region of the working channel has a first non-expanded shape that is expanded to a second expanded shape by introduction of the tool shaft through the working channel.

* * * * *